Patented Aug. 1, 1944

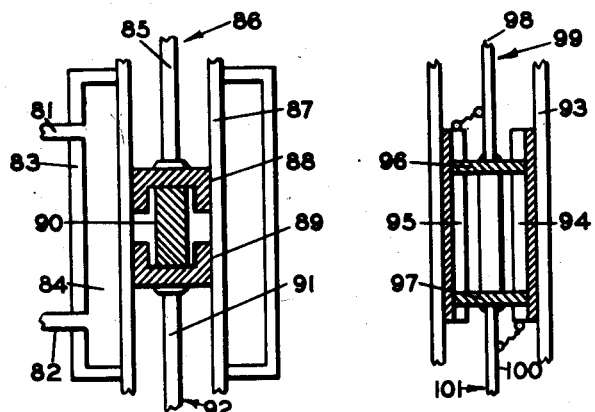

2,354,945

UNITED STATES PATENT OFFICE 2,354,945

LIQUID LEVEL SENSITIVE APPARATUS

Theodore A. Cohen and Hans J. Ostermann, Chicago, Ill., assignors, by mesne assignments, to Wheelco Instruments Company, Chicago, Ill., a corporation of Illinois Application April 11, 1939, Serial No. 267,326

3 Claims. (Cl. 73—304)

This invention relates to liquid level sensitive apparatus in general and more particularly to an apparatus for indicating a fluid level and for performing various functions in accordance with the fluid level.

A primary object of this invention is generally to provide an improved liquid level sensitive apparatus acting through the intermediary of an electronic device such, for example, as an oscillator for performing various functions in conjunction with the condition of the fluid level.

Other and further objects of this invention will be more apparent hereinafter from an examination of the specification and claims in conjunction with the accompanying drawings wherein:

Fig. 2 is a detail fragmentary sectional view of a modified form of variable capacity means capable of use in the circuit of Fig. 1 in lieu of the variable capacity means shown therein;

Fig. 3 is a similar view of another modified form of variable capacity means capable of such use;

Fig. 4 is a similar view of a modified form of variable inductance means capable of use in the circuit of Fig. 1 in lieu of the variable capacity means therein;

Fig. 5 is another modified form of variable capacity means;

Fig. 6 is another modified form of variable capacity means.

Figure 1:
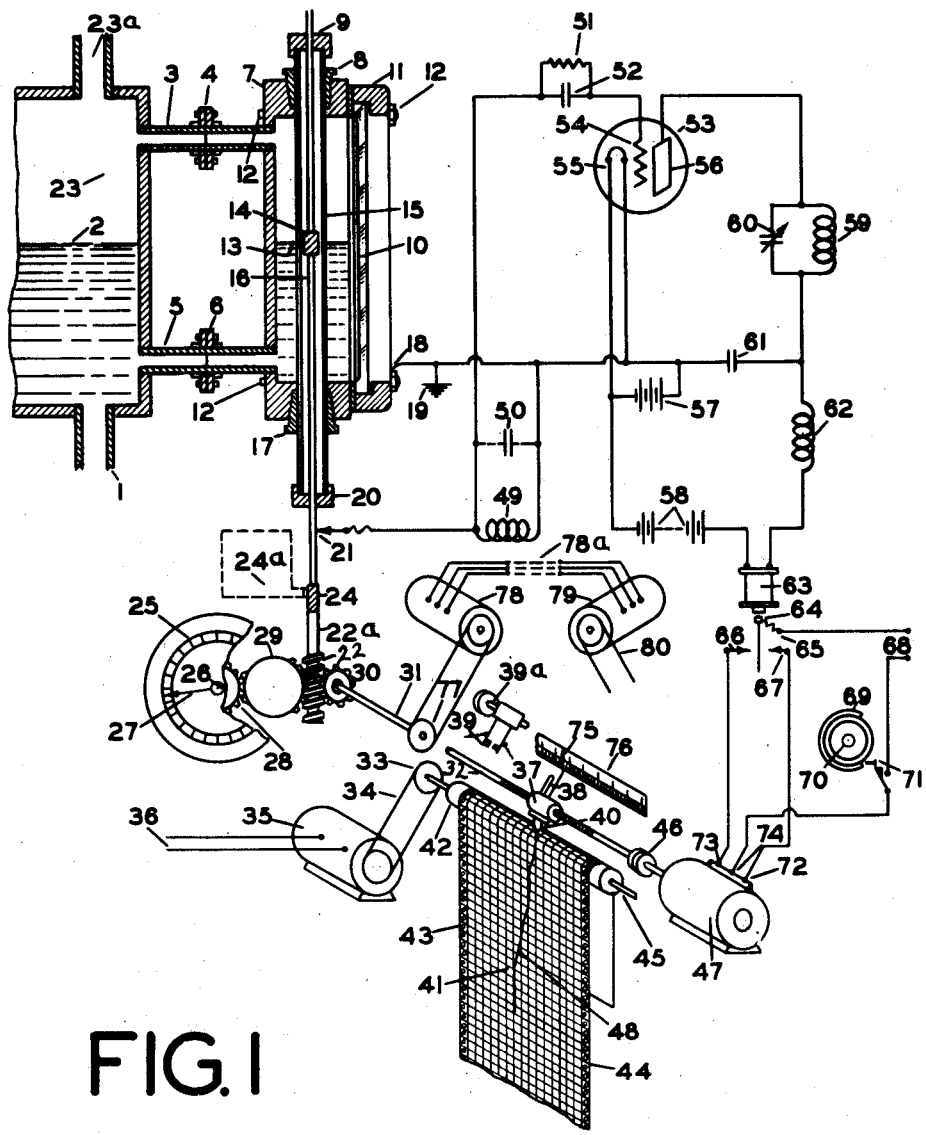
Fig. 1 represents a schematic view of a particular embodiment of the invention showing an apparatus for automatically indicating and recording the fluid level in a container such as a boiler, storage tank etc. and for performing certain safety functions in accordance with the condition of the fluid level.

Referring to the drawings more particularly, reference character 1 designates the feed line to a liquid container 23. The container 23 contains liquid at a variable level 2.

The container 23 is provided with upper and lower conduit fittings 3 and 5, respectively, leading therefrom and threadedly engaged therein. These fittings 3 and 5 are preferably provided with unions 4 and 6, respectively, to facilitate assembly and disassembly of the gauge 7 and for inspection, renewal or repair and are threadedly engaged in said gauge body. Extending vertically through the gauge body 7 is a glass or non-metallic tube 15. Stuffing boxes 8 and 17 are provided for preventing leakage past the tube 15 from within the gauge body 7.

A vertically slidable shaft or rod 16 extends through the tube 15 and has a metal capacity element or bob 14 fixed thereon. Bearing caps 9 and 20 of non-conducting material are provided for the rod 16 on either end of the tube 15.

The gauge body 7 is cast with its right side open and this open side is closed by a glass plate 10 held against the body by U-bolt assemblies 12 with suitable pressure gaskets.

An electron tube 53, acting in an oscillating circuit, is connected with a grid tank capacity 50 and grid tank inductance 49 in parallel between a filament 55 and grid 54. A grid condenser 52 and leak 51 are connected between said grid tank and grid.

A grid tank return connection 18 leads from one side of the grid tank to the gauge body 7 and this is grounded as at 19. The other side of the grid tank is connected through a contact finger 21 to the shaft 16. Thus if the liquid level 13 in the gauge body 7, which level follows the level 2 in the container 23, is lowered, the capacity effect produced between the liquid, acting as one plate of a condenser, and the capacitor element 14, acting as the other plate, is decreased; and if such level is raised such capacity is increased correspondingly affecting the natural resonant frequency of the grid tank.

The oscillator tube 53 has its plate 56 connected to a plate tank comprising an inductance 59 and capacity 60 in parallel therewith. This plate tank is connected to a source of current 58. A neutral position relay 63 is connected in the plate circuit together with an isolating choke coil 62. A filament heating source 57 is provided for filament 55, the latter being connected to a coupling or by-pass condenser 61 leading to the plate circuit and to the grid tank return 18.

The tank 59—60 in the plate circuit is tuned to predetermined resonance with the grid tank 49—50, together with the capacity between the capacitor element 14 and the liquid, when said element is at predetermined coincidence with the level of said liquid; the tuning being so chosen that the plate current through the relay 63 at such coincidence is at such level as to keep relay contact 64 in neutral position shown. Should a liquid level change occur, the capacity change between level 13 and element 14 will change the tuning of the grid tank deresonating or reresonating same depending upon direction of liquid change together with the plate tank; causing a change in plate current through relay 63 which thereupon makes contact 66 or 67 depending upon whether the liquid level has increased or decreased at 13. Thus the plate current will act upon relay 63 corresponding to variations in relative positions between the level 13 and the element 14 to correspondingly control mechanism which will now be described for indicating and recording such liquid level variations, for restoring the position of the capacitor element 14 to the new liquid level to thereby maintain the grid and plate tanks in predetermined resonance and for operating safety devices.

The armature and contact plate 64 of relay 63 is connected preferably through a flexible conductor 65 to one terminal of a source of current 68 for a reversing motor 47. The motor 47 is of a suitable type provided with a pair of field coils (not shown) having terminals 72 and 73, respectively, and a common central terinal 74. The terminal 74 leads to the other terminal of the source 68 through an anti-hunting device 69—70—71 to be more specifically described hereinafter.

The grid and plate tanks being predeterminedly resonated with respect to each other to such extent as to provide an intermediate plate current level when element 14 and liquid level are at predetermined coincidence, armature 64 will assume a neutral position under such circumstances. When the liquid level is lowered with respect to the element 14, the reduction in capacity thereby across the grid tank detuning the latter from the aforesaid predetermined resonant position with the plate tank and causing a rise in plate current above the aforesaid intermediate level, the armature 64 will contact a contact 67 leading to terminal 72 to drive motor 47 in one direction; and when the liquid level is raised with respect to the position of element 14, armature 64 will contact a contact 66 to drive said motor in the opposite direction. The motor 47 is coupled by a coupling 46 to a shaft 31.

The manner and means by which this motor 47, controlled as previously described, acts to cause the indication and recording of the liquid level and to maintain the capacitor element 14 at the liquid level as well as to cause operation of the other devices in accordance with the liquid level will now be described.

The shaft or rod 16 is provided with a rack extension 22 at its lower end connected thereto preferably by a non-conducting section 24. A gear 30 on the shaft 31 is in engagement with this rack to raise or lower rod 16 and capacitor element 14 thereon. The amount that the element 14 is thus raised or lowered depends upon the degree and direction of rotation of the motor 47. When the element 14 resumes its position relative and adjacent to the new level 13, the motor 47 will stop because the grid and plate tanks of the oscillator circuit will be thereby restored to predetermined resonance and the relay 63 will be restored to neutral position.

An indicator 25, calibrated in liquid column height, is provided with a pointer 27 on a shaft 26. The shaft 26 is geared to an intermediate gear 29 driven by the rack 22.

The recording means is also controlled from the shaft 31, the latter being provided with a cut worm 32 and a recording stylus carriage 37.

A synchronous motor 35, driven by a source 36 of current, in turn drives a chart gear 33 through a chain or transmission 34. The gear 33 is on a shaft 45 carrying a chart sprocket roller 42.

A recorder chart 41 is mounted on the roller 42, the latter having prongs thereon for driving engagement in holes 43 and 44 of the chart.

The carriage 37 is provided with a stylus 40 in engagement with the chart for making a record 48 thereon of the variations in liquid level and is also provided with a contact operating insulating stud 38 for operating a suitable alarm or safety cut-off means (not shown) at predetermined liquid levels. A contact 39 adapted to be engaged by stud 38 is adjustable with respect thereto, by means of a threaded rod assembly 39a, to open or close an electrical circuit with such alarm or safety cut-off means therein.

In case it is desired to indicate and record the liquid level at a remote position, the shaft 31, shown broken to indicate its extensible character, may be made any suitable length and the carriage 37 may be provided with a pointer 75 cooperating with a scale 76 calibrated the same as scale 25.

A more remote indicating and recording means may be provided by mounting a drive 77 on the shaft 31 for driving a suitable self synchronous transmitter 78. This transmitter 78 may be suitably inter-linked by transmission lines 78a to a suitable self-synchronous receiver 79 driving by means of 80 a remote recorder and indicating mechanism (not shown) which may be similar to the parts 32, 34, 35, 36, 39, 39a, 40, 41, 42, 43, 44, 75 and 76.

In Fig. 2 is shown a modified form of variable capacity means for use in conjunction with the control circuits, indicating, recording, restoring and other mechanisms previously described, and particularly adapted where the liquid in the container is non-conducting such as oil. In this embodiment the shaft corresponding to 16 is here shown in two sections 85 and 91 provided with upper and lower capacity members 88 and 89, respectively, separated by a non-metallic separator member 90. The gauge assembly is here briefly shown as a body 83 with upper and lower fittings 81 and 82 but it may take the same form as body 7 of Fig. 1. An inner glass or non-metallic tube 87 is also provided. In this embodiment the liquid acts as a dielectric. Separate contact fingers 86 and 92 are provided for the upper and lower shaft sections 85 and 91, respectively, and correspond to the points 18 and 21 in the circuit in Fig. 1.

As shown in Fig. 3 these capacity members such as 81 and 89 of Fig. 2 may be horizontally spaced, instead of vertically spaced, and are here designated 94 and 95, respectively.

In this embodiment the upper shaft section 98 is connected to one non-metallic separator 96 and the lower shaft section 100 is connected to another non-metallic separator 97, these separators serving as mounts for the capacity elements 94 and 95, one of which elements is electrically connected to the upper shaft section and the other of which is electrically connected to the lower shaft section. Contact fingers 99 and 101 correspond to fingers 86 and 92 of the previous embodiment.

In Fig. 4 is shown a modification of variable inductance means especially suitable for application to conducting fluids and similar to the variable capacity means of Fig. 3 except that here the horizontally spaced capacitor elements are eliminated and shaft sections 106 and 111 are spaced by a non-conducting spool-like separator 109 and an inductance coil 105 which may take the place of the grid tank inductance 49 or plate tank inductance 59 of Fig. 1, the coil 105 electrically connecting said shaft sections. In the use of this embodiment the inductance of the grid tank or plate tank, as the case may be, is varied to detune said tanks in substantially the same manner as the variable liquid sensitive variable capacity means of the previous embodiments except that an inductance change is accomplished instead of a capacity change as the liquid level varies.

In Fig. 5 is shown an immersion type of variable capacity means. A tank 113 of liquid 112 is provided with feeders 114 and 115 and a cover 116. A shaft 120, corresponding to 16 of Fig. 1, has a rack 119 attached thereto in engagement with a gear 118, corresponding to gear 30 of Fig. 1. A non-metallic bearing element 117 surrounds the shaft 120 and is fitted in an opening in the cover 116. A hollow annular sealed non-metallic member 123 is coupled to the lower end of shaft 120 by a coupling 122. Spaced capacity plates 124 and 125 are connected to leads 121 adapted to connect to the oscillator circuit of Fig. 1 at the points 18 and 21 therein. In this embodiment the entire member 123 follows the liquid level the same as element 14 of Fig. 1.

In Fig. 6 there is shown a modified form of hollow sealed annular non-metallic member 126, corresponding to member 123 of Fig. 5. Here in addition to spaced capacitor elements 128 and 129, corresponding to 124 and 125, respectively, there is provided a horizontally mounted inductance coil 134 connected therebetween which may take the place of tank inductance 49 or plate inductance 59 of Fig. 1. Thus the entire grid tank, or plate tank if desired, may be embodied in any of the previous embodiments as a self-contained unit comprising the variable capacity and/or inductance device which follows the liquid level.

The anti-hunting device, previously referred to, may take any suitable form and may be placed in any suitable part of the electrical circuit or mechanism, but is here shown as comprising a cam 69 on a drive shaft 70, operated from a suitably timed source of power. An interrupter 71 is operated by the cam 69 at timed intervals and is placed in the common lead from the reversing motor coils to the source 68. This interrupter 71 introduces a time lag which prevents recurrent cycling or hunting in the apparatus as a whole.

It will be apparent that the oscillator circuit itself may take a variety of forms.

It will also be apparent that the liquid level sensitive means (variable capacity and/or variable inductance devices) may be placed in other parts of the oscillating circuit besides across the grid tank as shown.

In commercial practice it is found to be highly important that the conductors between the liquid level sensitive means and oscillator be as rigid as possible and of constant capacity to prevent interfering with the predetermined tuning relationship between grid and plate tanks. This may be accomplished by mounting the entire oscillator assembly including parts 49 to 62, inclusive, rigidly to the movable member 24 on a mount 24a attached thereto as shown in Fig. 1.

Where the term "electrical reactive" is used in the appended claims it is intended to cover generically either capacitive reactance, inductive reactance, or both.

We are aware that many changes may be made and details varied without departing from the principles of our invention and we therefore do not wish to be limited to the details shown or described.

We claim:

1. In an apparatus of the character described, the combination of a liquid container, liquid level sensitive variable electrical reactive means including a movable member cooperating with the liquid in the container whereby relative movement between the liquid level and said member will vary said means in accordance with the change in liquid level, an oscillator responsive to such variation in said means and means controlled in turn by said oscillator for restoring said member to its previous relative position with respect to said level before the change and for indicating the liquid level, said oscillator being rigidly mounted with respect to said movable member.

2. In an apparatus of the character described, a liquid level sensitive variable electrical reactive means comprising a movable member adapted to be immersed in a liquid and having a pair of parallel plates associated therewith, insulated from the liquid, one of said plates being at ground potential.

3. In an apparatus of the character described, a liquid level sensitive variable electrical reactive means comprising a movable member adapted to be immersed in a liquid and having a pair of parallel plates associated therewith, insulated from the liquid, and an inductance coil connected between said plates.

THEODORE A. COHEN.
HANS J. OSTERMANN.